(12) United States Patent
Turunen

(10) Patent No.: US 9,124,480 B2
(45) Date of Patent: Sep. 1, 2015

(54) METHOD AND APPARATUS FOR SPECTRUM SENSING

(75) Inventor: Vesa Turunen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/351,080

(22) PCT Filed: Oct. 19, 2011

(86) PCT No.: PCT/FI2011/050908
§ 371 (c)(1),
(2), (4) Date: Apr. 10, 2014

(87) PCT Pub. No.: WO2013/057358
PCT Pub. Date: Apr. 25, 2013

(65) Prior Publication Data
US 2014/0241474 A1    Aug. 28, 2014

(51) Int. Cl.
*H04L 27/26* (2006.01)
*H04B 1/707* (2011.01)

(52) U.S. Cl.
CPC ............ *H04L 27/2663* (2013.01); *H04B 1/707* (2013.01); *H04L 27/2607* (2013.01); *H04B 2201/692* (2013.01)

(58) Field of Classification Search
CPC ............ H04L 27/0006; H04L 27/2601; H04L 27/2678
See application file for complete search history.

(56) References Cited

U.S. PATENT DOCUMENTS

| 8,526,520 B2 | 9/2013 | Turunen et al. |
| 2004/0190438 A1 | 9/2004 | Maltsev et al. |
| 2007/0140104 A1 | 6/2007 | Lim et al. |
| 2007/0281649 A1* | 12/2007 | Maeda et al. ................ 455/214 |
| 2010/0054352 A1* | 3/2010 | Huttunen et al. ............ 375/260 |
| 2011/0150150 A1* | 6/2011 | Sohn ............................ 375/343 |
| 2012/0140799 A1* | 6/2012 | Lim et al. ..................... 375/219 |
| 2012/0183030 A1* | 7/2012 | Turunen et al. .............. 375/224 |

FOREIGN PATENT DOCUMENTS

| EP | 2259525 | 12/2010 |
| WO | 2004008706 | 1/2004 |

OTHER PUBLICATIONS

Minseok Kim, Po Kimtho and Jun-ichi Takada, "Performance Enhancement of Cyclostationarity Detector by Utilizing Multiple Cyclic Frequencies of OFDM Signals", Singapore, Apr. 2010, IEEE.*

(Continued)

*Primary Examiner* — Aristocratis Fotakis
(74) *Attorney, Agent, or Firm* — Nokia Technologies Oy

(57) ABSTRACT

In accordance with an example embodiment of the present invention the application discloses a method and an apparatus to receive a signal (501) in a radio device on a radio channel; calculate a plurality of cyclic autocorrelations (504', 505) for the received signal (501), wherein calculating the plurality of cyclic autocorrelations comprises selecting a cyclic frequency (503) and at least two delay values (502, 512) corresponding to the plurality of cyclic autocorrelations (504', 505); to compensate a phase offset of at least one of the plurality of cyclic autocorrelations (504') by at least one compensation term (506) to obtain a plurality of phase compensated autocorrelations (504), wherein the compensation term (506) is dependent on the cyclic frequency (503) and a corresponding delay value of the at least two delay values; and to combine the plurality of phase compensated autocorrelations.

15 Claims, 5 Drawing Sheets

(56) References Cited

OTHER PUBLICATIONS

Vesa Turunen, Marko Kosunen, Sami Kallioinen, Aarno Pärssinen and Jussi Ryyänen, "Spectrum Estimator and Cyclostationary Detector for Cognitive Radio", Helsinki University of Technology, Nokia Research Center, Finland, 2009, IEEE.*

Vesa Turunen, Marko Kosunen, Visa Koivunen and Jussi Ryynänen "Dual-Lag Correlation-Based Feature Detection of OFDM Signals with Cyclic Phase Compensation", Aalto University School of Electrical Engineering, Finland, COCORA 2012.*

Dandawate et al., "Statistical Tests for Presence of Cyclostationarity", IEEE Transactions on Signal Processing, vol. 42, Issue: 9, Sep. 1994, pp. 2355-2369.

Cabric et al., "Cognitive Radios: System Design Perspective", Electrical Engineering and Computer Sciences, Technical Report No. UCB/EECS-2007-156, Dec. 17, 2007, 168 pages.

Meher et al., "50 Years of CORDIC: Algorithms, Architectures, and Applications", IEEE Transactions on Circuits and Systems I: Regular Papers, vol. 56, Issue: 9, Sep. 2009, pp. 1893-1907.

Lunden et al., "Robust Nonparametric Cyclic Correlation-Based Spectrum Sensing for Cognitive Radio", IEEE Transactions on Signal Processing, vol. 58, Issue: Jan. 1, 2010, pp. 38-52.

Turunen et al., "Implementation of Cyclostationary Feature Detector for Cognitive Radios", 4th International Conference on Cognitive Radio Oriented Wireless Networks and Communications, Jun. 22-24, 2009, pp. 1-4.

Tkachenko et al., "Cyclostationary Feature Detector Experiments Using Reconfigurable BEE2", 2nd IEEE International Symposium on New Frontiers in Dynamic Spectrum Access Networks, Apr. 17-20, 2007, pp. 216-219.

International Search Report received for corresponding Patent Cooperation Treaty Application No. PCT/FI2011/050908, dated Jun. 29, 2012, 5 pages.

\* cited by examiner

METHOD AND APPARATUS FOR SPECTRUM SENSING

RELATED APPLICATION

This application was originally filed as PCT Application No. PCT/FI2011/050908 filed Oct. 19, 2011.

TECHNICAL FIELD

The present application relates generally to wireless communications and spectrum sensing in cognitive radio applications. More particularly the present application relates to detection of orthogonal frequency division multiplexing signals in cognitive radio devices.

BACKGROUND

Cognitive radios are devices, which are capable of adapting their functionality according to the surrounding radio environment, user needs, and/or other circumstances. For example, a cognitive radio device may receive request from a user to create communication link to another user. The device may then independently determine how the communication should be actually implemented for optimized connectivity, capacity and user experience. Cognitive radio systems generally employ dynamic spectrum use to achieve maximum flexibility. A cognitive radio device is therefore to perform spectrum sensing to determine whether certain frequency range is currently used or not.

Orthogonal frequency division multiplexing (OFDM) is a multicarrier modulation method, which has been widely used in modern communication systems. Examples of such systems are the digital broadcasting standards DAB (Digital Audio Broadcasting), DVB-T (Digital Video Broadcasting-Terrestrial), DVB-T2 (Digital Video Broadcasting-$2^{nd}$ generation terrestrial), DVB-H (Digital Video Broadcasting-Handheld), CMMB (Chinese Mobile Multimedia Broadcasting, ISDB-T (Integrated Services Digital Broadcasting-Terrestrial), and T-DMB (Terrestrial Digital Multimedia Broadcasting). OFDM has been also applied in wireless local and wide area networks (LAN/WAN) such as the IEEE 802.11 standards. OFDM is also the technology for the latest cellular communication system in the 3GPP Long Term Evolution.

An OFDM signal may comprise a plurality of subcarriers modulated by constellation symbols, i.e., complex numbers carrying the data. The modulated subcarriers form individual subchannels which can be in a transmitter bundled together by the inverse fast Fourier transform (IFFT), which translates the created frequency domain subchannels into a time domain signal. Similarly, a receiver may perform fast Fourier transform (FFT) to access the individual subchannels and to decode the transmitted data.

Although the present invention is described using OFDM as an example, it should not be interpreted as limiting the scope of the invention. Conversely, the present invention may be applied to any signals with suitable statistical properties.

SUMMARY

Various aspects of examples of the invention are set out in the claims.

According to a first aspect of the present invention, a method comprises receiving a signal in a radio device on a radio channel; calculating a plurality of cyclic autocorrelations for the received signal, wherein calculating the plurality of cyclic autocorrelations comprises selecting a cyclic frequency and at least two delay values corresponding to the plurality of cyclic autocorrelations; compensating a phase offset of at least one of the plurality of cyclic autocorrelations by at least one compensation term to obtain a plurality of phase compensated autocorrelations, wherein the compensation term is dependent on the cyclic frequency and a corresponding delay value of the at least two delay values; and combining the plurality of phase compensated autocorrelations.

According to a second aspect of the present invention, an apparatus comprises: at least one processor; at least one memory containing executable instructions; and at least one shift register; wherein the executable instructions, when processed by the processor, cause at least to: receive a signal on a radio channel; produce a plurality of delayed signals from the received signal using the shift register; calculate a plurality of cyclic autocorrelations for the received signal using the plurality of delayed signals, wherein calculating the plurality of cyclic autocorrelations comprises selecting a cyclic frequency and at least two delay values corresponding to the plurality of cyclic autocorrelations; compensate a phase offset of at least one of the plurality of cyclic autocorrelations by at least one phase compensation term to obtain a plurality of phase compensated autocorrelations, wherein the phase compensation term is dependent on the cyclic frequency and the corresponding delay value; and combine the plurality of phase compensated autocorrelations.

According to a third aspect of the present invention a computer program product comprises a computer-readable medium bearing computer program code embodied therein for use with a computer, the computer program code comprising: code for receiving a signal in a radio device on a radio channel; code for calculating a plurality of cyclic autocorrelations for the received signal, wherein calculating the plurality of cyclic autocorrelations comprises selecting a cyclic frequency and at least two delay values corresponding to the plurality of cyclic autocorrelations; code for compensating a phase offset of at least one of the plurality of cyclic autocorrelations by at least one compensation term to obtain a plurality of phase compensated autocorrelations, wherein the compensation term is dependent on the cyclic frequency and the corresponding delay value; and code for combining the plurality of phase compensated autocorrelations

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE FIGURES

A cognitive radio device may perform spectrum sensing for instance to determine suitable frequency range for a transmission. The objective of spectrum sensing is therefore to detect presence of ambient communication signals in certain frequency band. Preferably, the detection should be both fast and reliable. In general, the detection performance is characterized by the detection sensitivity, i.e., the received signal power level that can still be detected with high enough probability in given detection time.

A short detection time is desirable for many reasons. For example, it may provide better time-resolution, i.e. that the time instances when the channel state changes are observed with improved accuracy. It may improve primary user protection, because appearance of the primary user may be detected with smaller delay and thus interfering secondary transmissions may be ceased faster. A short detection time also leaves more time for opportunistic access in a single-transceiver cognitive radio system that alternates between sensing and channel access modes. More powerful algorithms may improve the detection sensitivity without increasing the detection time. Using more complex algorithms may however lead to increased computational complexity, which translates into higher number of logic gates and increased power consumption and cost in the actual implementation.

Figure 1:
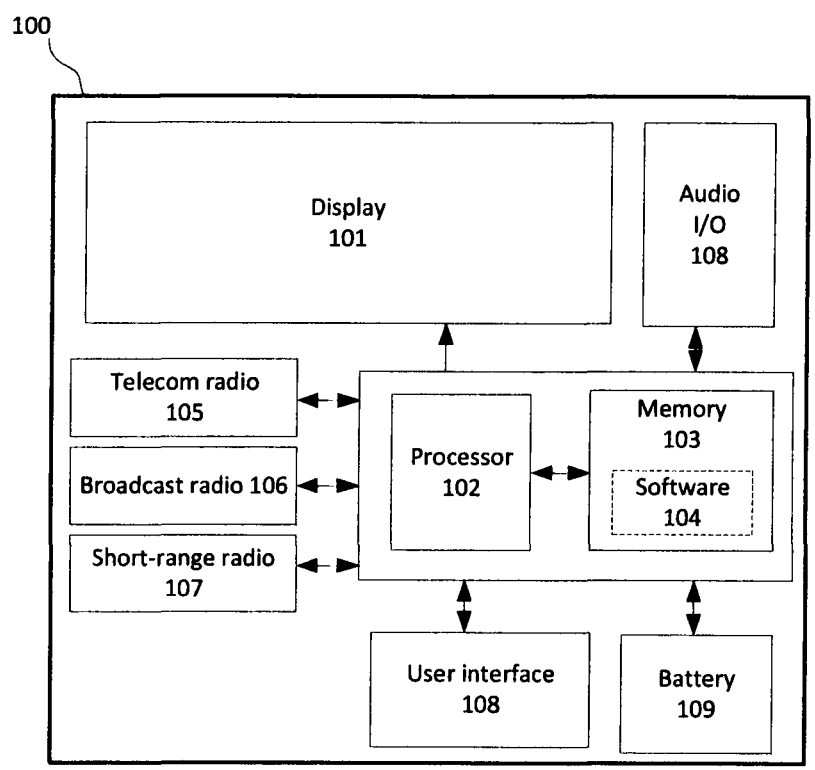
FIG. 1 presents an example of a spectrum sensing device.

FIG. 1 presents an exemplary apparatus where one or more embodiments presented herein may be implemented. Apparatus 100 may include at least one processor 102 in connection with at least one memory 103 or other computer readable media. Memory 103 may be any type if information storing media including random access memory (RAM), read-only memory (ROM), programmable readable memory (PROM), erasable programmable memory (EPROM) and the like, and it may contain software in form of computer executable instructions.

Apparatus 100 may also comprise one or more radios, for example one or more telecom radios 105, broadcast radios 106, or short-range radios 107 such as Bluetooth radio or a wireless local area network (WLAN) radio. Apparatus 100 may further comprise a user interface 108, display 101, and audio input/output 108 for communicating with the user. The apparatus may also comprise a battery 109 for delivering power for various operations performed in the device.

Apparatus 100 may use its resources, in particular the processor 102 and the memory 103 for various purposes. For example, the device may tune radio interfaces such as interfaces 105, 106, and 107 to certain radio channels. A radio channel may comprise a range of frequencies on the electromagnetic spectrum. Examples of the radio channels are the broadcast channels on VHF (very high frequency) and UHF (ultra high frequency) bands, cellular radio channels, and unlicensed radio channels in the ISM (industrial, scientific, and medical) band.

Apparatus 100 may use the radio interfaces for spectrum sensing, which may comprise determining whether a particular radio channel is occupied by radio transmissions from other apparatuses. The purpose of such search may be to find empty radio channels, where the apparatus can perform radio communications without interfering the ongoing radio transmissions and hence radio apparatuses. Spectrum sensing may also include scanning radio channels that do not have ongoing radio transmissions and a thus receiving a radio signal may be understood to include receiving merely noise and/or interference.

Communication signals may be generally modeled as stochastic processes having certain statistical properties. A cyclostationary signal has cyclostationary properties, that is, the statistical properties of the signal vary cyclically in time. An often used approximation for this strict definition of cyclostationarity is the definition of wide-sense cyclostationarity, where only the first and second order statistics, i.e., the mean and the autocorrelation of the signal are cyclic.

Cyclostationarity-based algorithms may be used in spectrum sensing implementations, since they provide good detection sensitivity and an inherent ability to distinguish one signal type from another. Cyclostationarity based spectrum sensing algorithms rely on the cyclostationary properties of the signal to be detected, and hence they are optimized for cyclostationary signals.

An OFDM signal may consist of a plurality of OFDM symbols. Each OFDM symbol may include a cyclic prefix, i.e., a guard interval, which may be inserted in the beginning of each OFDM symbol. The cyclic prefixes are mainly inserted to eliminate intersymbol interference from the previous OFDM symbol, but they can be used also for other purposes such as synchronization. Alternatively, the cyclic prefix may be inserted at the end of the OFDM symbol. In further embodiments, modifications of such cyclic extensions may be inserted both at the beginning and the end of the symbol, for example to provide a smooth change from OFDM symbol to another.

Figure 2:
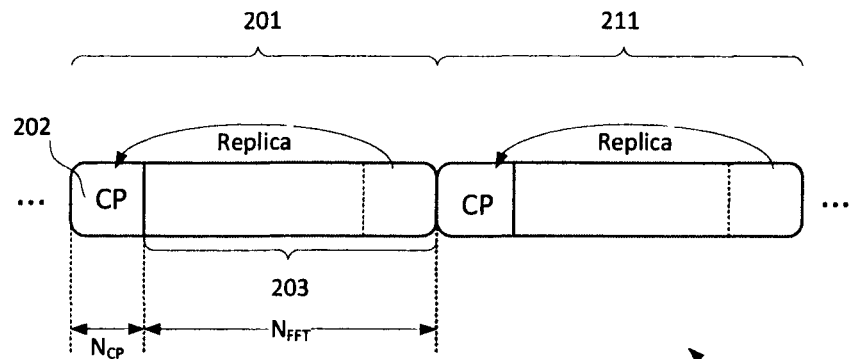
FIG. 2 illustrates an exemplary OFDM signal in time domain.

FIG. 2 presents an exemplary OFDM signal 200 in time domain including two OFDM symbols 201 and 211. OFDM symbol 201 consists of the data block 203, which represents the plurality of subcarriers in time domain. The length of this portion is $N_{FFT}$ which is also the FFT size of the system. As an example, an OFDM system may have 6817 active subcarriers which are modulated by QAM (Quadrature Amplitude Modulation) constellation symbols. The FFT size of the system may be 8192 (8K) and the non-active subcarriers may set to zero before applying an 8192-point IFFT in the transmitter. Applying IFFT to the subcarriers (active and non-active) yields the time domain representation of the subcarriers, i.e., the data block 203.

The OFDM symbol 201 may also include a cyclic prefix (CP), which may be a replica of the last $N_{CP}$ samples the data block 203. In some applications the cyclic prefix may not be a direct copy of the last data block sample, but it may be for example modified or combined to the samples of the previous/next OFDM symbol. The length of the cyclic prefix is typically selected based on the characteristics of the radio channel. An OFDM signal designed for a radio channel with long echoes will typically have a long cyclic prefix to avoid interference between consecutive OFDM symbols.

Insertion of a cyclic prefix causes an OFDM signal to have cyclostationary properties. Therefore, the cyclostationary based spectrum sensing algorithms are suitable for detection of OFDM signals due to the strong periodic correlation provided by the cyclic prefixes. Detecting a cyclostationary signal may be generally done by calculating the conjugate cyclic autocorrelation $$\hat{R}_x^\alpha(\tau) = \frac{1}{N} \sum_{n=0}^{N-1} x[n]x^*[n-\tau]e^{-j2\pi\alpha n},$$

where $x^*[n]$ is a complex valued input signal, $\alpha$ is a cyclic frequency, and $\tau$ is a delay parameter, which represents the delay of particular autocorrelation lag. The cyclic frequency $\alpha$ and the delay parameter $\tau$ are related to the periodicity of the signal. Adjusting these parameters the cyclostationarity based spectrum sensing algorithm may be tuned to detect different type of signals. Parameter N denotes the number of received samples that are used for signal detection and therefore together with the signal sampling rate determines the detection time.

A hypothesis test may be applied to the correlation result to make a decision if x[n] exhibits cyclostationarity with certain α and τ values or not. The test statistic may be calculated as $T = r_{x,K} \hat{\Sigma}^{-1} r_{x,K}^T$, where $\hat{\Sigma}^{-1}$ the estimate is the estimate of inverse covariance matrix and vector $r_{x,K} = [\hat{R}_x^\alpha(\tau_1) \ \hat{R}_x^\alpha(\tau_2) \ldots \hat{R}_x^\alpha(\tau_K)]$ contains the estimates of the conjugate cyclic autocorrelation for K different delay values. When the received signal x[n] contains only additive white Gaussian noise (AWGN), the test statistics is chi-square distributed with 2K degrees of freedom. Therefore, a constant false alarm rate test can be performed by comparing the test statistics to a threshold that is obtained from the inverse of the chi-square cumulative distribution function (cdf). If the observed test statistics value exceeds the pre-calculated threshold, then it is concluded that a signal is detected.

Amplitude of the received signal samples x[n] can be normalized without altering the cyclostationary characteristics of the received signal. This improves robustness against impulsive noise at the cost of only minor performance penalty in AWGN channel. This also leads to a simpler implementation since noise statistics are known a priori and therefore the covariance matrix does not need to be estimated from the received samples. The input sample normalization may be denoted as spatial sign function $$S(x[n]) = \begin{cases} \frac{x[n]}{|x[n]|} & x[n] \neq 0 \\ 0 & x[n] = 0 \end{cases}.$$

A spatial sign cyclic correlation estimator (SSCCE) may be defined as $$\hat{R}_S^\alpha(\tau) = \frac{1}{N} \sum_{n=0}^{N-1} S(x[n]) S(x^*[n-\tau]) e^{-j2\pi\alpha n},$$

where the spatial sign function has been used to normalize the input samples x[n] before calculating the correlation.

A constant alarm rate test similar to what is described above can be defined as $T_s = N \|r_{S,K}\|^2$, where $r_{S,K} = [\hat{R}_S^\alpha(\tau_1) \ \hat{R}_S^\alpha(\tau_2) \ldots \hat{R}_S^\alpha(\tau_K)]$. For AWGN, the test statistics $T_S$ is gamma distributed with shape factor K and scale factor 1. Consequently, the threshold for constant false alarm rate test can be obtained from inverse of gamma cdf. The formulation of the constant alarm rate test shows the benefit of application of the spatial sign function as the test statistics takes computationally much simpler form compared to the conventional test statistic $T = r_{x,K} \hat{\Sigma}^{-1} r_{x,K}^T$.

The general constant alarm rate test $T_S = N \|r_{S,K}\|^2$ utilizing K correlation delay values may be simplified by limiting the number of correlation delays. One example of such simplified test is a dual-lag correlator, which uses two correlation delays to calculate the test statistics. A dual-lag correlator may be defined as $$T_{S,2} = N \left| \underbrace{\frac{1}{N} \sum_{n=0}^{N-1} S(x[n]) S(x^*[n-\tau_1]) e^{-j2\pi\alpha n}}_{c_1} \right|^2 +$$

$$N \left| \underbrace{\frac{1}{N} \sum_{n=0}^{N-1} S(x[n]) S(x^*[n-\tau_2]) e^{-j2\pi\alpha n}}_{c_2} \right|^2$$

where $\tau_1$ and $\tau_2$ represent the two correlation delays and $c_1$ and $c_2$ are the autocorrelations corresponding to these delays.

This dual-lag correlator may be used to detect OFDM signals by selecting the two delays such that they match the periodicity of an OFDM signal. Suitable values for the delays are for example $\tau_1 = N_{FFT}$ and $\tau_2 = N_{FFT}$. In an alternative embodiment, the equation may be written such that the system becomes causal.

In yet another embodiment, the cyclic frequency α may be selected to match the properties of an OFDM signal. In a further embodiment, the cyclic frequency may be defined by the FFT size and cyclic prefix length, for example by $\alpha = 1/(N_{CP} + N_{FFT})$, where $N_{CP}$ is the number of samples in the cyclic prefix and $N_{FFT}$ denotes the size of the IFFT that is used to form the data part of the OFDM symbol. A particular lag of the autocorrelation is corresponds to the delay that is used when calculating the autocorrelation. Both lags can be utilized simultaneously to increase the detection sensitivity while keeping the detection time constant.

For this dual-lag mode for OFDM, the spatial sign cyclic correlation estimator can be written as $$T_{S,2} = N \left| \underbrace{\frac{1}{N} \sum_{n=0}^{N-1} S(x[n]) S(x^*[n - N_{FFT}]) e^{-j2\pi\alpha n}}_{c_1} \right|^2 +$$

$$N \left| \underbrace{\frac{1}{N} \sum_{n=0}^{N-1} S(x[n]) S(x^*[n + N_{FFT}]) e^{-j2\pi\alpha n}}_{c_2} \right|^2$$

where the two conjugate cyclic autocorrelation functions, obtained using different delay values $+N_{FFT}$ and $-N_{FFT}$, are denoted as $c_1$ and $c_2$, respectively.

Figure 3A:
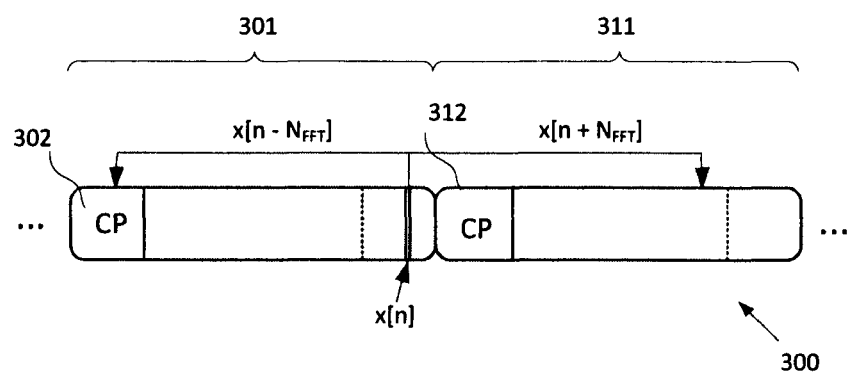
FIG. 3ab illustrates functionality of an exemplary dual-lag correlator.
Figure 3B:
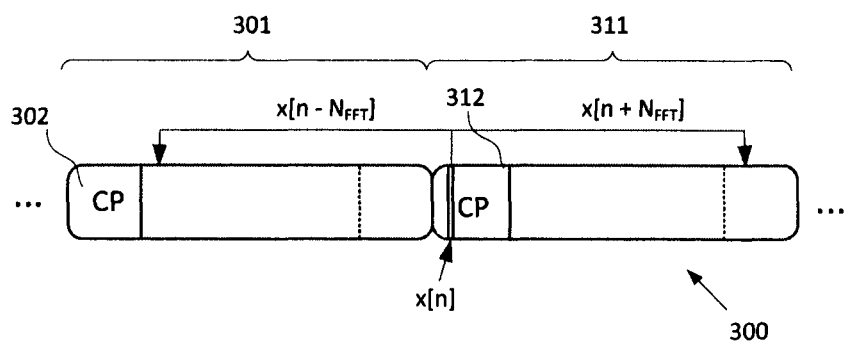

FIG. 3a and FIG. 3b illustrate functionality of an exemplary dual-lag correlator designed to detect an OFDM signal 300. The two delay values have been selected to be $+N_{FFT}$ and $-N_{FFT}$. In FIG. 3a, a sample x[n] is located at the end of an OFDM symbol 301. Since the cyclic prefix is a replica of the end of the data block, sample x[n] has high correlation to sample $x[n-N_{FFT}]$. On the contrary, sample x[n] does not correlate to sample $x[n+N_{FFT}]$, since the data block of the following OFDM symbol 311 is independent of the data block of the current OFDM symbol 301.

In FIG. 3b, a sample x[n] is located in the beginning of the OFDM symbol 311. Since the cyclic prefix is a replica of the end of the data block, sample x[n] has high correlation to sample $x[n+N_{FFT}]$. On the contrary, sample x[n] does not correlate to sample $x[n-N_{FFT}]$, since the data block of the preceding OFDM symbol 301 is independent of the data block of the current OFDM symbol 311.

From the example above it can be seen that the two autocorrelations $c_1$ and $c_2$ produce correlation in different parts of the OFDM signal. When calculating the decision statistics, both autocorrelation functions $c_1$ and $c_2$ should be taken into account. However, combining the two correlations is not directly possible. Instead, absolute square of both conjugate cyclic autocorrelation functions $c_1$ and $c_2$ is calculated prior to the final sum.

Figure 4:
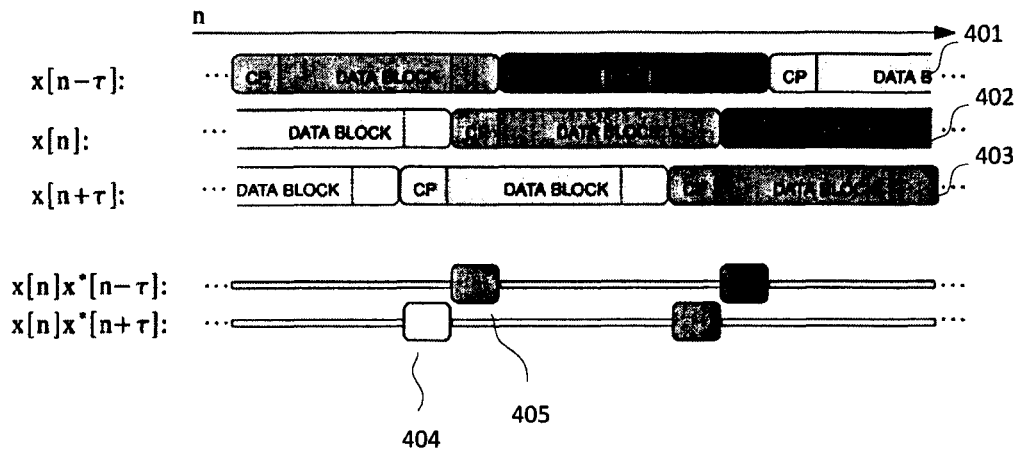
FIG. 4 illustrates an example of calculating two autocorrelations in accordance with an embodiment of the invention.

FIG. 4 further illustrates the two autocorrelations. OFDM signals 401 and 403 represent the differently delayed (±τ) versions of the OFDM signal 402. It can be seen that the correlations from the two lags 404 and 405 occur at different time periods and the relative delay between the detected correlations is equal to the cyclic prefix length.

The formulation of the dual-lag correlator includes the exponent term $e^{-2\pi\alpha n}$ in order to tune the algorithm to the correct cyclic frequency according to the statistical properties of the signal to be detected. This term collects the desired cyclic frequency, which improves the performance over conventional detectors without the exponent term. Such a conventional detector is less complex, but it is not able to optimally employ the cyclostationary properties of the signal, which leads to inferior performance compared to the cyclic correlation. Also, using the exponent term makes the signal detection more robust to DC (direct current) offset. An object of the present invention is a low complex detector, which utilizes the cyclostationary properties of the signal to be detected.

The two autocorrelation functions $c_1$ and $c_2$ present two complex values that have some magnitude and phase in complex plane. The stronger the correlation, the larger the magnitudes. Since the two autocorrelation functions produce correlation at different parts of the signal, the cyclic frequency of the dual-lag correlation causes a phase offset between the two autocorrelation functions $c_1$ and $c_2$. Hence, direct addition of the two autocorrelations may cause degradation in detection performance.

The phase offset between the two autocorrelation functions is denoted as $\phi = \arg(C_1) - \arg(C_2)$. It turns out that when detecting an OFDM signal with delay values $+N_{FFT}$ and $-N_{FFT}$, the phase difference □ is constant for consecutive OFDM symbols and can be expressed as a function of the correlation delay, $N_{FFT}$, and the cyclic frequency, $\alpha$, by $\phi = 2\pi N_{FFT} \alpha$. This can be in another embodiment presented as $$\phi = 2\pi \frac{N_{FFT}}{N_{CP} + N_{FFT}}.$$

The computational complexity of the dual-lag correlator may be advantageously reduced by utilizing the constant characteristic of the phase offset. If the phase offset is compensated, the two autocorrelations can be combined, which simplifies the implementation dual-lag correlator. Different embodiments of the combining may include direct summation, maximum ratio combining, weighted average and the like.

A phase compensated dual-lag correlator according to an embodiment of the invention may be defined as $$T_{SC,2} = 2N \left| \frac{1}{2N} \sum_{n=0}^{N-1} (S(x[n])S(x^*[n-\tau_1])e^{-j2\pi\alpha n} + S(x[n])S(x^*[n-\tau_2])e^{-j2\pi\alpha n+\phi}) \right|^2$$

where the phase of latter autocorrelation is compensated. The compensation term may depend on the characteristics of the signal to be detected. In the example case of OFDM, the compensation term may comprise the cyclic frequency, which may be calculated using the OFDM parameters $N_{CP}$ and $N_{FFT}$.

The main difference when compared to the non-phase compensated dual-lag correlator is the constant phase shift, φ, in the second exponent term. Computationally the phase compensated form is simpler because it does the summation of the two cyclic autocorrelation functions before calculating the absolute square value. In this case, the absolute square value operation is executed only once. Test statistics for the phase compensated dual-lag correlator is also gamma-distributed, but with scale factor 1 as opposed to scale factor 2 for the non-phase compensated correlator. Therefore, this the phase compensated correlator provides improved detection sensitivity for the same amount of received samples.

In another embodiment according to the invention, the phase compensated dual-lag correlation is calculated without the input sample normalization S(x[n]) and the test statistics may be calculated $$T_{SC,2} = 2N \left| \frac{1}{2N} \sum_{n=0}^{N-1} (x[n]x^*[n-\tau_1]e^{-j2\pi\alpha n} + x[n]x^*[n-\tau_2]e^{-j2\pi\alpha n+\phi}) \right|^2$$

which may provide better performance since the information in the amplitudes of the received samples may not be lost.

Although the implementation of the algorithm is described using dual-lag correlation as an example, a person skilled in the art would understand that the number of delays can be increased and that phase offset compensation can be applied also for multiple correlation lags. Similarly, it is to be understood that the calculations presented in this document are merely examples and alternative versions or approximations of the equations are within the scope of this invention.

The calculations may be further simplified by performing at least some of the calculations in angular domain. This helps to avoid complex multiplications. Angular domain, i.e., polar coordinate representation suits the algorithm well since the signal magnitude is one for all non-zero samples. Amount of zero samples can be assumed to be assumed negligible. The phase of each sample may be denoted as $\phi_x[n] = \arg(x[n])$ and the phase compensated dual-lag correlator may be written as $$T_{SC,2} = 2N \left| \frac{1}{2N} \sum_{n=0}^{N-1} (e^{j(\phi_x[n] - \phi_x[n-\tau_1] - \phi_\alpha[n])} + e^{j(\phi_x[n] - \phi_x[n-\tau_2] - \phi_\alpha[n]+\phi)}) \right|^2,$$

where the phase $\phi_\alpha[n] = 2\pi\alpha/N$.

Because additions are difficult to implement in angular domain, after finishing the calculation of the exponents the signal is mapped back to Cartesian coordinates. The calculation of the argument and mapping back to Cartesian coordinates can be effectively implemented with the well-known CORDIC algorithm.

Figure 5:
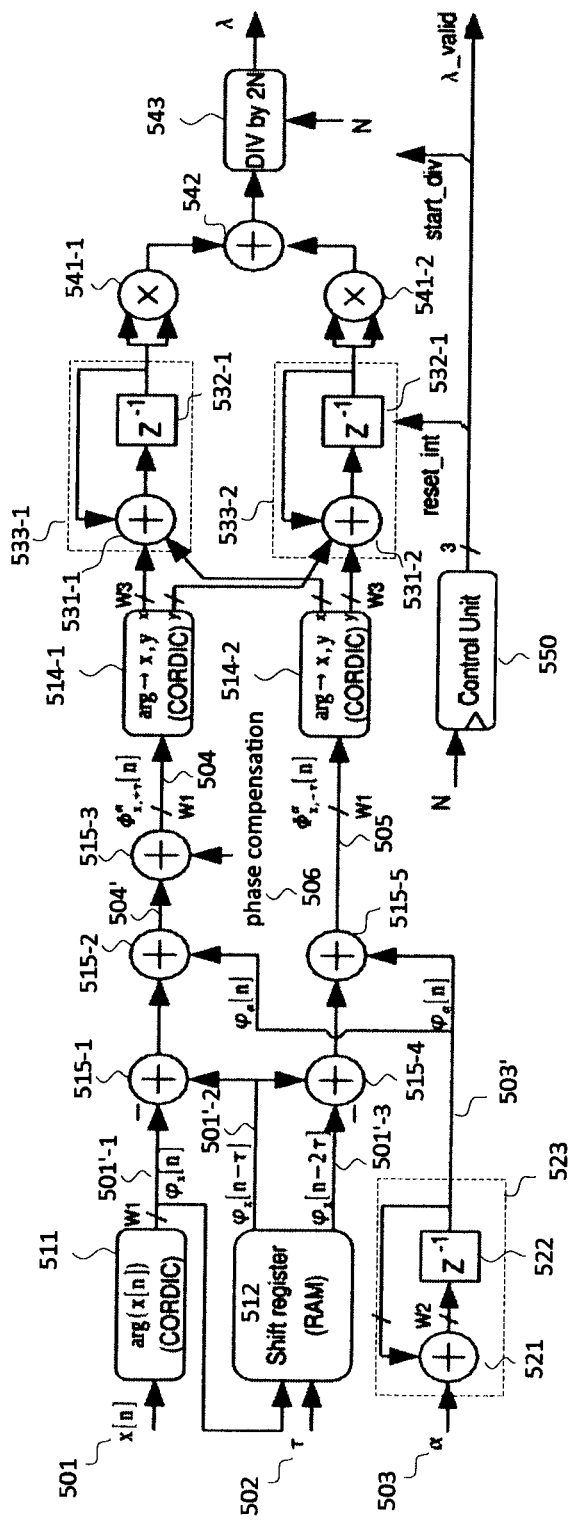
FIG. 5 presents an implementation of an algorithm according to an embodiment of the invention.

FIG. 5 presents an exemplary implementation of the algorithm according to an embodiment of the invention. The structure calculates the phase compensated dual-lag correlation using partly the angular domain to further reduce the complexity of the algorithm. The input signal x[n] 501 is fed to a first type CORDIC block 511 to calculate the argument of the input samples so as to produce an angular domain received signal 501'-1 ($\phi_x[n]$). A random access memory (RAM) block 512 may be used to implement the two delays. The shift register 512 may receive one or more delay values 502 as input. This exemplary implementation is causal, so the shift register 512 may produce differently delayed angular domain received signals 501'-2 ($\phi_x[n-\tau]$) and 501'-3 ($\phi_x[n-2\tau]$), where $\tau$ and $2\tau$ are used as delays instead of $\pm\tau$. A simple integrator 523 comprising an adder 521 and a delay element 522 may be used to accumulate the cyclic frequency $\alpha$ 503 to obtain the exponential cyclic frequency signal 503' ($\phi_\alpha[n]$) corresponding to the exponential term. Signal 503 may cause the algorithm to be selective to the target cyclic frequency. Adders 515-1, 515-2, 515-3, 515-4, 515-5 may be then used to finish the calculation of the exponential signals 504 ($\Phi_{x,+\tau}^\alpha[n]$) and 505 ($\Phi_{x,-\tau}^\alpha[n]$) including correction of an exponential signal 504' by the phase offset 506 to obtain the phase compensated exponential signal 504.

After the exponential signals 504 and 505 have been resolved, they may be mapped back to Cartesian coordinates using two second type CORDIC's 514. The coordinate translations may be followed by two integrators, each integrator comprising a corresponding adder 531-1 or 531-2 and a corresponding delay element 532-1 or 532-2. Finally, the algorithm may be completed by calculation of the absolute square comprising two different multipliers 541-1 and 541-2 and an adder 542 which receives the signals from both multipliers 541-1 and 541-2, and a final division by divider 543 receiving the output from adder 542 and producing the output $\lambda$.

More particularly, signals $\phi_x[n-\tau]$ and $\phi_x[n-2\tau]$ output from the shift register 512 may be guided to adder 515-4. Signal $\phi_x[n-2\tau]$ may be inverted in order to subtract it from $\phi_x[n-\tau]$ to produce input signal for adder 515-5. Similarly, signal $\phi_x[n-\tau]$ and the angular domain received signal $\phi_x[n]$, which may be output from the first type CORDIC 511, may be guided to adder 515-1. Signal $\phi_x[n]$ may be inverted in order to subtract it from $\phi_x[n-\tau]$ to produce input signal for adder 515-2. Adder 515-2 may hence calculate the sum of the output signal of adder 515-1 and signal $\phi_\alpha[n]$ from the integrator 523 to produce a first angular cyclic autocorrelation signal 504'. Adder 515-5 may similarly calculate the sum of the output signal of adder 515-4 and signal $\phi_\alpha[n]$ from the integrator 523 to produce a second angular cyclic autocorrelation signal 505. Adder 515-3 may be used to compensate the phase offset by summing the phase offset correction term 506 to signal 504', hence producing a phase compensated angular autocorrelation signal 504. In another embodiment the phase compensation can be done after adder 515-5 for signal 505.

Signals 504 and 505 may be input to second type CORDICs 514-1 and 514-2 to convert the signals to Cartesian coordinate signals, each comprising components x and y. The x coordinates from the CORDICs 514-1 and 514-2 may be guided to integrator 533-1 comprising adder 531-1 and delay element 532-1 to accumulate the x signals from the CORDICs 514-1 and 514-2. They coordinates from the CORDICs 514-1 and 514-2 may be guided to integrator 533-2 comprising adder 531-2 and delay element 532-2 to accumulate they signals from the CORDICs 514-1 and 514-2. The accumulated x coordinate signal from integrator 533-1 may be guided into the two inputs of multiplier 541-1 to perform squaring of the x coordinate signal. The accumulated y coordinate signal from integrator 533-2 may be guided into the two inputs of multiplier 541-2 to perform squaring of they coordinate signal. The outputs from multipliers 541-1 and 541-2 may be guided to adder 542 to combine the squared coordinate signals. Output from the added 542 may be divided by 2N in block 543, which may take parameter N, the number of received sample used in the correlation, as an input. Finally, the algorithm may give the decision statistic as an output $\lambda$.

A control unit 550 may control the calculations providing reset signal for integrators 523, 533-1 and 533-2. Control unit 550 may also provide a signal for commanding the divider to perform divisions. The control unit may receive as an input parameter the number of samples to be used for signal detection, N, which is then used to determine proper timing for the resetting the integrators and/or calculating the division. The control unit may also provide an output signal $\lambda$_valid to indicate when the output of the detection algorithm is valid.

Figure 6:
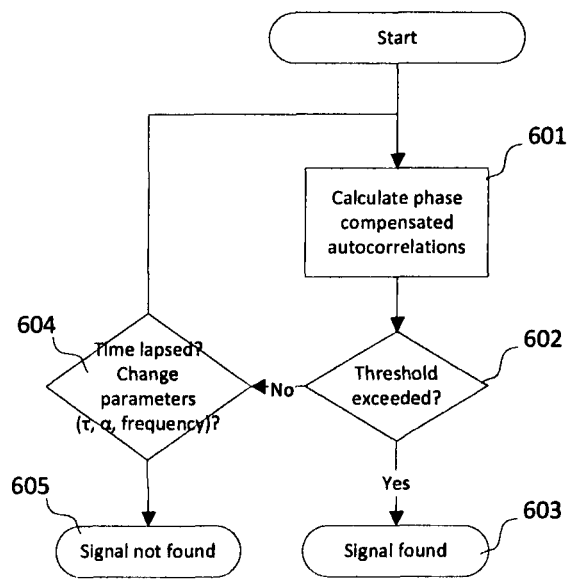
FIG. 6 presents an exemplary flow chart according to an embodiment of the invention.

FIG. 6 presents an exemplary flow chart illustrating the functionality of an exemplary spectrum sensing radio device. The spectrum sensing is started and first test statistics are calculated by the phase compensated autocorrelations in block 601, e.g., using the implementation presented in FIG. 5. The device may comprise control logic to determine a threshold based on the characteristics of the radio environment, for example, the noise level. Alternatively, the threshold may be predetermined and fixed. The device may compare the calculated test statistics to the threshold in step 602, and determine whether the threshold is exceeded. In response to detecting that the threshold is exceeded the device may conclude that a signal is found.

If the threshold is not exceeded, the receiver may continue signal detection with the same parameters until a predefined time has lapsed. The receiver may also change the parameters of the phase compensated autocorrelation to search for different type of signals. The receiver may also change the frequency on which the detection is performed. If still no signal is found, the receiver may in step 605 determine that the frequency is empty. The receiver may then begin transmission on the empty frequency.

Figure 7:
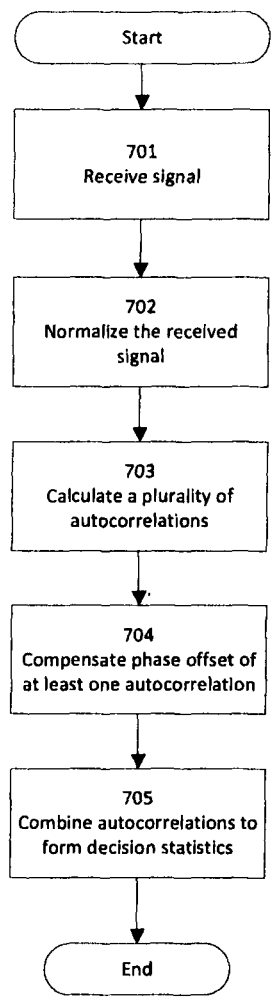
FIG. 7 presents an exemplary flow chart according to an embodiment of the invention.

FIG. 7 presents an exemplary flow chart according to an embodiment of the invention. The exemplary algorithm presented in FIG. 7 may be for example performed as part of block 601 in FIG. 6. In phase 701 a radio device receives a signal. In phase 702, the receiver may normalize the samples of the received signal for example using the spatial sign function described earlier in this document. In stem 702, the receiver may calculate a plurality of autocorrelations. For example, the receiver may calculate the spatial sign cyclic autocorrelation using two delay values as described earlier in this document. In phase 704, the receiver may compensate a phase offset of at least one of the calculated autocorrelations. For example, the receiver may use the expected properties of the signal to be detected to determine how the phase compensation should be performed. In step 705, the receiver may combine the different autocorrelations and the receiver may also use the combined autocorrelations to form a decision statistics. For example, the combining may be done using at least one of summation, maximum ratio combining or weighted average. After phase 705 the algorithm may be finished and the receiver may use the decision statistics to determine whether the received signal included signal(s) from other radio devices. It should be noted that the above phases of the algorithm are presented for merely exemplary purposes. A person skilled in the art would appreciate that the phases may be optional, and/or they may be combined, and/or performed as a part of another algorithms without departing from the spirit of the invention.

Apparatus 100 may be a cognitive radio device able to perform the calculations of the presented correlations and phase compensation. For example the processor 102 may calculate the correlations, and/or perform the phase compensation based on the instructions stored in the memory, and/or normalize the input samples, and/or combining at least two autocorrelations. In general, apparatus 100 may comprise means for performing various types of calculations. For example, the apparatus may comprise means for calculating the correlations, and/or means for performing the phase compensation, and/or mean for normalizing the input samples, and/or means for combining at least two autocorrelations.

Apparatus 100 may include computer program code for causing to perform the various operations. For example, the apparatus may comprise computer program code to cause to perform calculations of the presented autocorrelations, and/or perform the phase compensation based on the instructions stored in the memory, and/or normalize the input samples, and/or combine at least two autocorrelations.

Without in any way limiting the scope, interpretation, or application of the claims appearing below, a technical effect of one or more of the example embodiments disclosed herein is improving the detection sensitivity of a cyclostationarity based spectrum sensing algorithm. At the same time the embodiments of the invention reduce the computational complexity and hence enable faster calculation of the correlation. The algorithm provides also a shorter detection time and cheaper implementation compared to conventional algorithms when targeting the same detection performance.

Embodiments of the present invention may be implemented in software, hardware, application logic or a combination of software, hardware and application logic. The software, application logic and/or hardware may reside on a cognitive radio device such as a mobile phone, laptop, handheld computer, portable music device, accessory or the like. In general, such device may include means for computing and means for storing data on a readable memory in order to perform the functionality according to one or more embodiments of the invention.

In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 1. A computer-readable medium may comprise a computer-readable storage medium that may be any non-transitory media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   receiving a signal in a radio device on a radio channel;
   calculating a plurality of cyclic autocorrelations for the received signal, wherein calculating the plurality of cyclic autocorrelations comprises selecting a cyclic frequency and at least two delay values corresponding to the plurality of cyclic autocorrelations;
   compensating a phase offset of at least one of the plurality of cyclic autocorrelations by at least one compensation term to obtain a plurality of phase compensated autocorrelations, wherein the compensation term is dependent on the cyclic frequency and a corresponding delay value of the at least two delay values; and
   combining the plurality of phase compensated autocorrelations.

2. The method of claim 1, wherein the received signal is an orthogonal frequency division multiplexing signal, and wherein the cyclic frequency and the delay values are selected based on a fast Fourier transform size and a cyclic prefix length of the orthogonal frequency multiplexing signal.

3. The method of claim 1, wherein calculating the plurality of cyclic autocorrelations further comprises normalizing input samples of the received signal.

4. The method of claim 1, wherein the combined plurality of phase compensated autocorrelations forms decision statistics, further comprising:
   determining from the decision statistics whether other radio devices are using the radio channel; and
   in response to determining that other radio devices are not using the radio channel, using the radio channel for radio communication.

5. The method of claim 1, wherein samples of the received signal are transformed into angular domain and the phase compensation is done by summing at least one phase correction term to at least one angular domain signal.

6. An apparatus, comprising:
   at least one processor;
   at least one memory containing executable instructions; and
   at least one shift register; wherein the executable instructions, when processed by the processor, cause at least to:
   receive a signal on a radio channel;
   produce a plurality of delayed signals from the received signal using the shift register;
   calculate a plurality of cyclic autocorrelations for the received signal using the plurality of delayed signals, wherein calculating the plurality of cyclic autocorrelations comprises selecting a cyclic frequency and at least two delay values corresponding to the plurality of cyclic autocorrelations;
   compensate a phase offset of at least one of the plurality of cyclic autocorrelations by at least one phase compensation term to obtain a plurality of phase compensated autocorrelations, wherein the phase compensation term is dependent on the cyclic frequency and the corresponding delay value; and
   combine the plurality of phase compensated autocorrelations.

7. The apparatus of claim 6, further comprising:
   at least one first type Cordic block to convert the received signal into an angular domain received signal causing the shift register to produce a plurality of angular domain delayed signals; and
   at least one adder to add the phase compensation term into at least one angular cyclic autocorrelation signal corresponding to the at least one of the plurality of cyclic autocorrelations to compensate the phase offset and to obtain a plurality of phase compensated angular cyclic autocorrelations corresponding to the plurality of phase compensated autocorrelations.

8. The apparatus of claim 7, further comprising:
a first integrator to produce an exponential cyclic frequency signal; and
a plurality of adders to produce the at least one angular cyclic autocorrelation signal from the angular domain received signal, the plurality of angular domain delayed signals, and the exponential cyclic frequency signal.

9. The apparatus of claim 7, further comprising:
a plurality of second type Cordic blocks to convert the plurality of phase compensated angular cyclic autocorrelations into a plurality of Cartesian signals, each comprising a first and a second coordinate signals;
a plurality of second integrators to produce accumulated first and second coordinate signals from the plurality of Cartesian signals;
a plurality of multipliers to square the accumulated first and second coordinate signals to produce squared first and second coordinate signals; and
a divider to divide the squared first coordinate signal by the squared second coordinate signal to produce an output signal.

10. The apparatus of claim 9, further comprising:
a control unit to provide a reset signal for the first integrator or at least one of the plurality of the second integrators, a start signal for the divider, and an indication signal to indicate the validity of the output signal.

11. A computer program product comprising a non-transitory computer-readable medium bearing computer program code embodied therein for use with a computer, the computer program code comprising:
code for receiving a signal in a radio device on a radio channel;
code for calculating a plurality of cyclic autocorrelations for the received signal, wherein calculating the plurality of cyclic autocorrelations comprises selecting a cyclic frequency and at least two delay values corresponding to the plurality of cyclic autocorrelations;
code for compensating a phase offset of at least one of the plurality of cyclic autocorrelations by at least one compensation term to obtain a plurality of phase compensated autocorrelations, wherein the compensation term is dependent on the cyclic frequency and the corresponding delay value; and
code for combining the plurality of phase compensated autocorrelations.

12. The computer program product of claim 11, wherein the received signal is an orthogonal frequency division multiplexing signal, and wherein the cyclic frequency and the delay values are selected based on a fast Fourier transform size and a cyclic prefix length of the orthogonal frequency multiplexing signal.

13. The computer program product of claim 11, wherein the code for calculating the plurality of cyclic autocorrelations further comprises code for normalizing input samples of the received signal.

14. The computer program product of claim 11, wherein the combined plurality of phase compensated autocorrelations forms decision statistics, and wherein the computer program code further comprises:
code for determining from the decision statistics whether other radio devices are using the radio channel; and
in response to determining that other radio devices are not using the radio channel, code for using the radio channel for radio communication.

15. The computer program product of claim 11, wherein samples of the received signal are transformed into angular domain and the phase compensation is done by summing at least one phase correction term to at least one angular domain signal.

* * * * *